(12) United States Patent
Brownell et al.

(10) Patent No.: US 6,797,041 B2
(45) Date of Patent: Sep. 28, 2004

(54) TWO STAGE AIR FILTER

(75) Inventors: Kyle A. Brownell, Schofield, WI (US); Scott W. Mathews, Mosinee, WI (US); Alan Lorenz Breitenfeldt, Wausau, WI (US); Emery W. Neltzel, Rothschild, WI (US)

(73) Assignee: Greenheck Fan Corporation, Schofield, WI (US)

( * ) Notice: Subject to any disclaimer, the term of this patent is extended or adjusted under 35 U.S.C. 154(b) by 0 days.

(21) Appl. No.: 10/090,040

(22) Filed: Mar. 1, 2002

(65) Prior Publication Data

US 2003/0164093 A1 Sep. 4, 2003

(51) Int. Cl.$^7$ .......................... B01D 50/00; B01D 24/10; B01D 45/12

(52) U.S. Cl. ............................. 95/268; 95/269; 95/274; 95/900; 55/337; 55/346; 55/466; 55/483; 55/484; 55/467; 55/516; 55/522; 55/523; 55/486; 55/512; 55/DIG. 36; 96/135

(58) Field of Search .......................... 55/337, 467, 486, 55/515, 522, 523, DIG. 36, 346, 447, 483, 345, 484, 506, 516, 466, 512; 95/268, 269, 274, 900; 96/135, 139

(56) References Cited

U.S. PATENT DOCUMENTS

| | | |
|---|---|---|
| 3,354,623 A | 11/1967 | Keller |
| 3,955,949 A | 5/1976 | Rohrer |
| 3,970,558 A | 7/1976 | Lee |
| 4,082,661 A | 4/1978 | Aoki et al. |
| 4,104,163 A | 8/1978 | Grutsch |
| 4,118,206 A | 10/1978 | Hagendoorn |
| 4,126,433 A | 11/1978 | Forssberg et al. |
| 4,172,031 A | 10/1979 | Hall et al. |
| 4,177,142 A | 12/1979 | Halbfoster |
| 4,231,768 A | 11/1980 | Seibert et al. |
| 4,238,334 A | 12/1980 | Halbfoster |
| 4,292,285 A | 9/1981 | Nakao et al. |
| 4,328,105 A | 5/1982 | Arbuckle |
| 4,350,504 A | 9/1982 | Diachuk |
| 4,388,086 A | 6/1983 | Bauer et al. |
| 4,484,563 A | 11/1984 | Fritz et al. |
| 4,485,622 A | 12/1984 | Takagi et al. |
| 4,534,775 A | 8/1985 | Frazier |
| 4,595,509 A | 6/1986 | Fox et al. |
| 4,604,110 A | 8/1986 | Frazier |
| 4,610,705 A | 9/1986 | Sarnosky et al. |
| 4,645,605 A | 2/1987 | Durham |

(List continued on next page.)

FOREIGN PATENT DOCUMENTS

| | | |
|---|---|---|
| DE | 74699 | 7/1970 |
| EP | 1238879 | 9/2002 |
| GB | 1.014.594 | 12/1965 |
| GB | 1255268 | 12/1971 |
| WO | WO 02/070105 A2 | 9/2002 |

OTHER PUBLICATIONS

G. Elliott et al, "The increasing Use of Ceramic Filters in Air Pollution Control Applications," Filtr. Sep. vol. 34 No. 4 pp. 331–335, 1997, Elsevier Science Ltd.

N. Singh et al., "Precess Design and Economic Analysis of a Ceramic Membrane System for Microfiltration of Com Starch Hydrolysate," Journal of Food Engineering, vol. 38 No. 1 pp. 57–67 1998 Elsevier Science Ltd.

*Primary Examiner*—Robert A. Hopkins
(74) *Attorney, Agent, or Firm*—Quarles & Brady LLP

(57) ABSTRACT

A two stage air purification system is provided for the removal of airborne impurities from an airflow prior to the airflow entering a building's ductwork. In particular, a primary air filter is mounted within the hood of, for example, a cooking area and operable to receive grease-laden air and remove a portion of the impurities. The air is then sent to a secondary filter, also mounted within the hood, that removes additional impurities. The air is then sent through the building's ductwork and eventually out the building.

71 Claims, 5 Drawing Sheets

U.S. PATENT DOCUMENTS

| | | |
|---|---|---|
| 4,682,992 A | 7/1987 | Fuchs |
| 4,708,000 A | 11/1987 | Besik |
| 4,721,624 A | 1/1988 | Schumann |
| 4,805,525 A | 2/1989 | Bivens |
| 4,816,499 A | 3/1989 | Nomura et al. |
| 4,872,892 A | 10/1989 | Vartiainen et al. |
| 4,900,341 A | 2/1990 | Csabai |
| 4,908,050 A | 3/1990 | Nagashima et al. |
| 4,976,760 A | 12/1990 | Helferich et al. |
| 5,003,693 A | 4/1991 | Atkinson et al. |
| 5,087,272 A | 2/1992 | Nixdorf |
| 5,124,177 A | 6/1992 | Kasmark, Jr. et al. |
| 5,133,786 A | 7/1992 | Anderson |
| 5,145,648 A | 9/1992 | Miyahara et al. |
| 5,154,743 A | 10/1992 | Takato et al. |
| 5,171,720 A | 12/1992 | Kawakami |
| 5,209,887 A | 5/1993 | Von Blucher et al. |
| RE34,636 E | 6/1994 | Bivens |
| 5,384,290 A | 1/1995 | Brezny |
| 5,404,799 A | 4/1995 | Bivens |
| 5,442,924 A | 8/1995 | Tsai et al. |
| 5,486,370 A | 1/1996 | Bivens |
| 5,497,620 A | 3/1996 | Stobbe |
| 5,512,088 A | 4/1996 | McKenzie |
| 5,567,090 A | 10/1996 | Basak et al. |
| 5,567,392 A | 10/1996 | Becker et al. |
| 5,624,875 A | 4/1997 | Nakanishi et al. |
| 5,628,916 A | 5/1997 | Stevens et al. |
| 5,632,889 A | 5/1997 | Tharp |
| 5,693,298 A | 12/1997 | Bar-Ilan |
| 5,700,973 A | 12/1997 | Siddiqui |
| 5,733,350 A | 3/1998 | Muller |
| 5,750,026 A | 5/1998 | Gadkaree et al. |
| 5,766,458 A | 6/1998 | Sekhar et al. |
| 5,776,354 A | 7/1998 | van der Meer et al. |
| 5,792,360 A | 8/1998 | Algar |
| 5,810,895 A | 9/1998 | Staehle et al. |
| 5,976,221 A | 11/1999 | Bowman et al. |
| 5,997,618 A | 12/1999 | Schneider et al. |
| 6,010,558 A | 1/2000 | Ackland |
| 6,042,628 A | 3/2000 | Nishikiori |
| 6,050,208 A | 4/2000 | Kennedy |
| 6,051,199 A | 4/2000 | Teller |
| 6,074,177 A | 6/2000 | Kobayashi et al. |
| 6,077,335 A | 6/2000 | Schneider et al. |
| 6,077,800 A | 6/2000 | Takahashi et al. |
| 6,095,037 A | 8/2000 | Savage et al. |
| 6,165,519 A | 12/2000 | Lehrer et al. |
| 6,168,651 B1 | 1/2001 | Tuma et al. |
| 6,237,587 B1 | 5/2001 | Sparling et al. |
| 6,251,153 B1 | 6/2001 | Neitzel et al. |
| 6,293,983 B1 | 9/2001 | More |
| 6,340,379 B1 | 1/2002 | Penth et al. |
| 6,432,177 B1 | 8/2002 | Dallas et al. |
| 6,464,770 B1 | 10/2002 | Palm et al. |
| 6,605,648 B1 | 8/2003 | Johnson |
| 6,641,788 B1 | 11/2003 | Ogawa et al. |
| 2003/0024393 A1 | 2/2003 | Lim |
| 2004/0011203 A1 | 1/2004 | Fitch |

TWO STAGE AIR FILTER

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to air filters, and in particular, relates to air purification systems for commercial kitchens.

Air purification systems are primarily used to extract impurities, such as grease, from grease-laden air formed in commercial kitchens and other similar environments during cooking. Grease extractors are typically a cleanable or replaceable component of kitchen ventilation systems disposed above a cooking area, such as a stove or the like. A fan in the ventilation system draws grease-laden air through the filter media which extracts the grease from the air prior to exhausting the air into the atmosphere. The extracted grease may run down the filter wall and be collected for proper disposal, or the grease may be trapped within the filter media that may be subsequently cleaned.

Conventionally, a primary air filter is mounted onto the hood of a cooking area for the removal of large grease and other airborne particles before the air travels through the ductwork of a building and is ultimately expelled into the outside environment. A secondary air filter is located at the outlet of the building's ductwork to remove additional smaller air impurities before the air is released. Various filters are available for such an air purification system.

Conventional centrifugal air filters cause air to enter a helical path in a vortex chamber and subject the impurities to a centrifugal force. The impurities are propelled away from the vortex center and impinge upon chamber walls. The air exits the vortex chamber leaving the impurities behind in the chamber. One such centrifugal air filter is described in U.S. Pat. No. 6,251,153 entitled "Centrifugal Air Filter" the disclosure of which is hereby incorporated by reference as if set forth in its entirety herein. Centrifugal air filters are advantageous in that the extracted air impurities run down the filter wall and are collected for proper disposal, thereby minimizing the need for cleaning and other maintenance efforts that could cause down-time. While air filters of this type are effective at removing large air impurities that may be flung against the side of the filter, smaller impurities may remain in the air and travel into the ductwork and fan of the building.

Baffle filters define an enclosure having an inlet that receives grease laden air. The enclosure defines a plurality of baffle plates that force the air to abruptly change the direction of travel several times prior to exiting the filter. As the air changes direction, grease and other impurities are propelled away from the air stream and impinge upon the chamber walls. The grease may then run down into a collection cup.

Another type of filter, known as an impact filter, traditionally includes a wire mesh bed packed with filtration particles. As air is drawn through the impact filter, the media will trap impurities therein such that a cleaner air is output. While impact filters are successful at removing both large particles suitable for a centrifugal fan along with smaller particles that may escape a centrifugal fan, depending on the filter media, they often accumulate a significant amount of dirt in a relatively short period of time. The accumulation presents a blockage to the air passing therethrough, which produces a significant pressure drop across the filter and limits the air flow rate through the purification system and ultimately the cleanliness of the air passing through. Impact filters thus require frequent cleaning and maintenance.

While such air purification systems are suitable for their intended purpose, grease and other volatile organic compounds (VOC's) tend to accumulate within the ductwork, thereby necessitating frequent maintenance and cleaning.

It is thus desirable to provide a reliable air purification system that removes both large and small particles from the air prior to the air entering a building's ductwork.

BRIEF SUMMARY OF THE INVENTION

The present invention provides an air purification system for receiving incoming air containing impurities and outputting purified air into ductwork of a building. The system includes a hood defining a hood outlet in communication with the ductwork. A primary filter member is mounted to the hood for receiving the incoming air, removing at least a portion of impurities therefrom, and outputting a primary airflow. A secondary filter member is mounted to the hood at a location downstream of the primary filter and receives the primary output airflow. The secondary filter member has a secondary filter media that is operable to remove impurities from the primary airflow and output a secondary airflow to the hood outlet that is cleaner than the primary airflow.

A general objective of the present invention is to provide an air purification assembly achieving an improved extraction of airborne impurities from an airflow prior to the airflow traveling within the internal ductwork of a building. By providing a first filter member for removing impurities and a second filter member for removing additional impurities, a cleaner air is output to the ductwork, thus reducing the frequency of maintenance to the ductwork.

These and other objects and advantages of the invention will be apparent from the description that follows. In the description reference is made to the accompanying drawings which form a part hereof and in which there is shown by way of illustration, and not limitation, embodiments of the invention. Such embodiments do not necessarily represent the full scope of the invention. Reference should therefore be made to the claims herein for interpreting the scope of the invention.

BRIEF DESCRIPTION OF THE DRAWINGS

Reference is hereby made to the following figures in which like reference numerals correspond to like elements throughout, and in which.

DETAILED DESCRIPTION OF THE INVENTION

Figure 1:
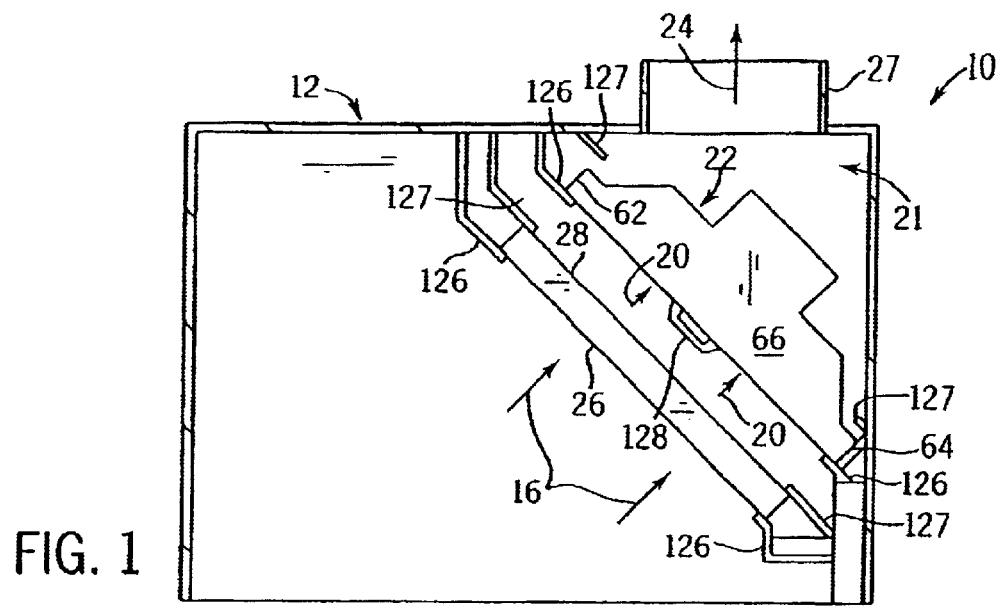
FIG. 1 is side elevation view of a ventilation hood having a primary air filter and secondary air filter constructed in accordance with the preferred embodiment.

Referring initially to FIG. 1, an air purification system 10 suitable for extracting grease and other particles, such as VOC'S, from grease-laden air is mounted on an angle at one end of a ventilation hood 12 that is disposed above a food cooking area (not shown). Hood 12 defines an outlet to a duct collar 27 that provides an interface from the hood to the ductwork system (not shown) of the building. In particular, a primary air filter 18 is angularly mounted within the hood 12 that, along with the interior walls of the hood, defines an enclosure 21 disposed between the filter and outlet duct collar 27. The enclosure 21 ensures that only filtered air is able to travel into the duct collar 27. A secondary filter 22 is also angularly mounted within the hood at a location within the enclosure between the primary filter 18 and the duct collar 27. In particular, lower and upper guide rails 126 and 127, respectively, extend laterally across the hood 12 and supports the outer ends of the filter 22, as will be described in more detail below.

During operation, a fan (not shown) draws grease-laden air 16 into the hood 12 and through the primary air filter 18 to remove large particles from the air. The partially cleaned air 20 is subsequently drawn through the secondary air filter 22 for the removal of smaller particles from the air that were not removed by the primary filter 18. "Clean" air 24 is thus expelled from the hood 12 through the duct collar 27 and travels through the internal ductwork and out the building. Advantageously, the internal ductwork of the building does not accumulate dirt and grease as quickly as conventional systems that use a secondary filter at the outlet of the building's ductwork.

Figure 2:
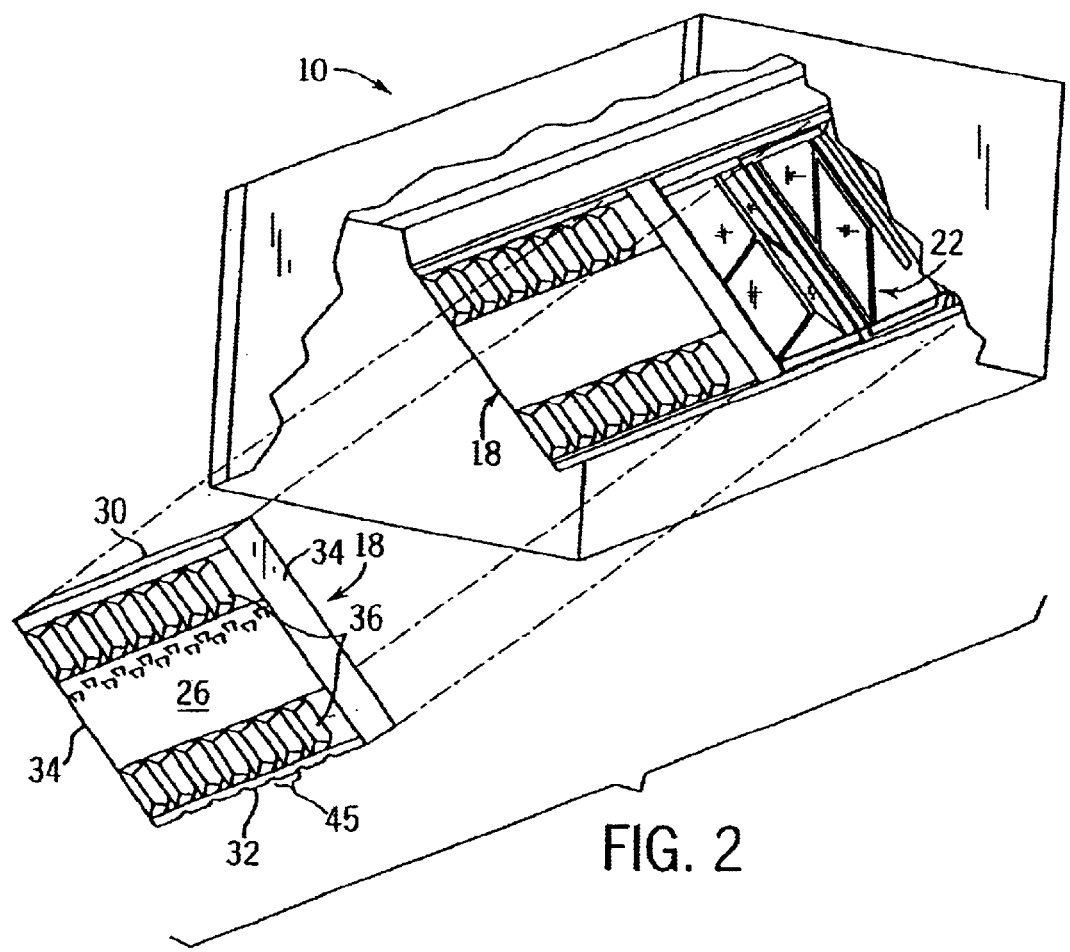
FIG. 2 is an exploded perspective view of the ventilation hood illustrated in FIG. 1 to further illustrate the primary air filter.
Figure 3:
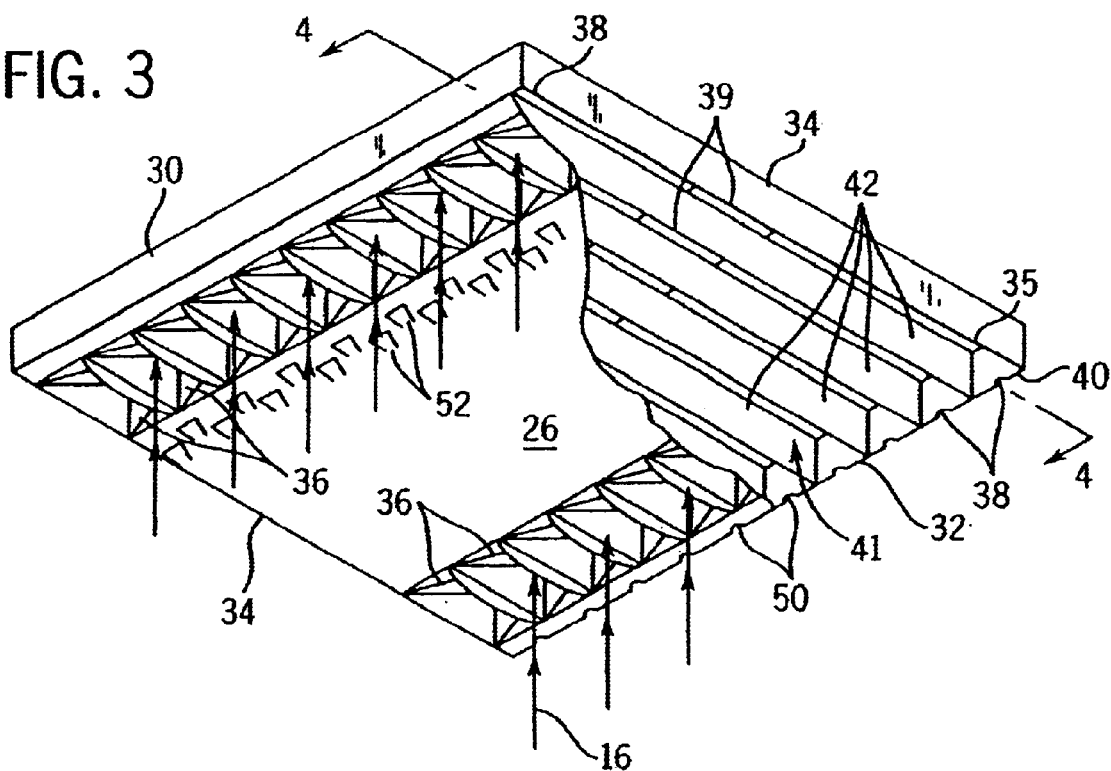
FIG. 3 is a cut away front perspective view of the primary cross sectional view of the primary air filter illustrated in FIG. 1.
Figure 4:
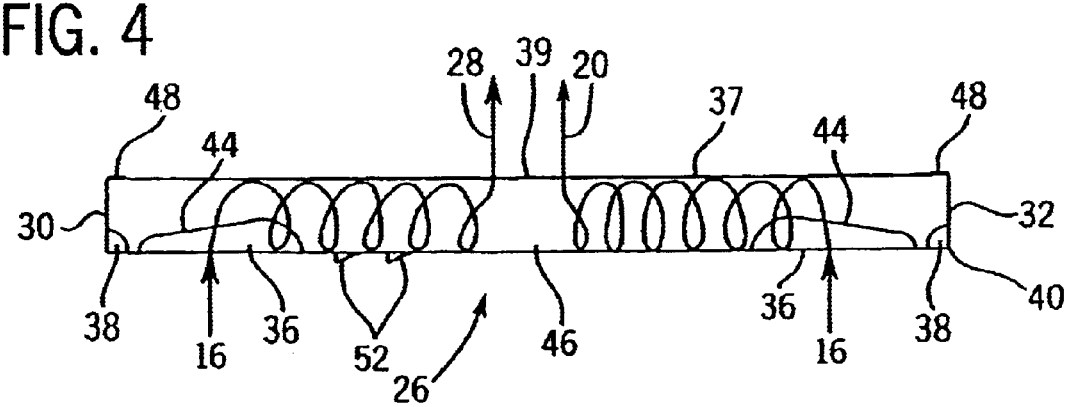
FIG. 4 is a sectional side elevation view of the air filter illustrated in FIG. 3 taken along line 4—4.

Referring particularly to FIGS. 2–4, the primary air filter 18 has a front wall 26 and a rear wall 28 joined at its perimeter by a top wall 30, bottom wall 32, and opposing sidewalls 34. The cavity formed by the walls 26, 28, 30, 32, and 34 is divided into a plurality of separate vortex chambers 35.

Each vortex chamber 35 has a pair of inlets 36 located at opposite ends 38 of the vortex chambers 35, and a single outlet 39 located at the midpoint of the chamber 35. Grease-laden air 16 enters a vortex chamber 35 through the pair of inlets 36 formed in the filter front wall 26, and exits the chamber 35 through the outlet 39 formed in the filter rear wall 28. The filter 18 captures the grease by directing the grease-laden air 16 along a helical path through the vortex chambers 35. The helical path causes the grease particles suspended in the air to impinge against the chamber walls and then flow along the chamber wall to a collection point. Forming the inlets 36 proximal opposing chamber ends 38 prevents the air 16 entering each inlet 36 from passing directly to the outlet 39 and avoiding the helical path. This ensures that a maximum amount of grease is extracted from the air 16.

In accordance with the preferred embodiment, the filter 18 includes a tray-shaped base 40 with the filter front wall 26, and a top wall 30, bottom wall 32, and side walls 34 defining the filter perimeter. The walls 30, 32, and 34 extend rearwardly and substantially perpendicular from the front wall 26 to form a tray cavity 41. Dividers 42 dividing the cavity 41 and defining the vortex chambers 35 in cooperation with the base 40 are mounted in the cavity 41. The base 40 is preferably formed from a single sheet of material to eliminate seams and facilitate cleaning the filter front wall 26.

The pairs of inlets 36 are formed in the front wall 26 and provide an entry for the grease-laden air 16 into the chambers 35. The inlet pairs 36 are spaced along the front wall substantially parallel to the base side walls 34. Preferably, the front wall 26 is deformed rearward to form vortex generators 44 at each inlet 36. The vortex generators 44 direct air 16 entering the inlet 36 into a helical path inside the chamber 35 toward the chamber center 46.

The dividers 42 are retained in the cavity 41 by folding flaps 48 over the dividers 42 inserted therein. Looking particularly at FIG. 4, the flaps 48 are formed on rear edges of the base top 30, bottom 32, and sides 34 which are folded over to retain the interlocked dividers 42 in the base cavity 41. Advantageously, folding the flaps over the dividers minimizes air leaks from the chambers 35. The flaps 48 are secured at each base corner and sides using methods known in the art, such as using tack welds, spot welds, screw type fasteners, and the like, to prevent the flaps 48 from inadvertently releasing the dividers 42.

Grease impinged onto the vortex chamber walls drains out of the chamber 35 through apertures 50 punched in the base bottom 32 at the end 38 of each chamber 35. During heavy grease loading of the filter, similar to heavy duty cooking, the vortex generators 44 can become loaded with grease. This heavy loading of grease may develop into runs down the front wall 26. To prevent the runs from running completely down the entire front face 26, small louvers 52 are formed, such as by punching into the front face just below the vortex generators 44 at each inlet 36 proximal the filter top. Two rows of staggered louvers 52 are used to cover the entire surface (left to right). The staggered louvers 52 assure any runs from the vortex generators 44 will be caught by a louver.

The louvers 52 need only be formed on the top portion of the filter, and not the bottom, making the filter top to bottom orientation specific. However, if the louvers are not required, the apertures 50 can be punched in the base top 30 and bottom 32 allowing the filter 18 to be mounted in the hood 12 without reference to the filter top 30 or bottom 32 orientation.

To simplify the filter assembly 18 and reduce assembly costs, the vortex chambers 35 are formed by interlocking dividers 42 which are inserted into the cavity 41. The elongated L-shaped dividers 42 are inserted into the tray cavity 41 and cooperate with the base 40 and adjacent dividers 42 to form the elongated vortex chambers 35. Each divider 42 extends the width of the base 40 and has a side wall substantially parallel to the base side walls 34 and a rear wall 37 substantially parallel to the front wall 22 to form the filter rear wall 28. The rear wall of each divider 42 is disposed above a different pair of inlets 36 and has a notch formed generally centrally therein defining the chamber outlet 39. Edges of the divider rear wall and side walls are bent inward and abut the base 40 or adjacent divider 42 to minimize air leaks.

The dividers 42 are preferably formed from the same material using the same processes as the base 40 and are interlocked to simplify the filter assembly 18. Tabs formed in each divider 42 extend into slots formed in the adjacent divider 42 to lock adjacent dividers 42 together. The tab and slot construction eliminates a need to spot weld or otherwise secure each individual divider 42 in the cavity 41.

By providing a vortex chamber 35 having front inlets 36 and a rear outlet 39, the air enters and exits the filter 18 in substantially parallel directions to enable the air to easily enter the secondary filter 22, as will be described in more detail below. This arrangement furthermore provides a more compact filter 18 relative to an air filter in which the air exits the air filter substantially perpendicular to the air entering the filter, such as through the chamber ends. Furthermore, a rear outlet air filter does not require a specially adapted ventilation hood to channel air exiting the chamber ends into the hood.

In another embodiment, the base, dividers or portions thereof are coated with a dry lubricant, such as described in U.S. Pat. No. 6,050,258 entitled "Exhaust fan with dry lubricant coating" the disclosure of which is hereby incorporated by reference as if set forth in its entirety herein.

It should be appreciated that conventional centrifugal filters are not capable of removing all grease and other impurities from grease-laden air. For this reason, a secondary filter has been conventionally installed at the outlet of a building's ductwork to further remove pollutants before the air is emitted into the environment. However, the partially cleansed air output by the primary filter leaves grease, dirt, and sludge on the interior of the ductwork and in the plenum of the hood, thereby necessitating frequent cleaning and maintenance.

In accordance with the preferred embodiment, a secondary filter 22 is mounted within the hood at a position downstream of primary filter 18 within the enclosure 21, and receives the partially cleaned air (primary airflow) 20 from the primary filter. It should be appreciated that the term "downstream" is used herein with reference to the direction of airflow 16, 20, and 24. As will be described in more detail below, secondary filter 22 is an impact filter whose filter media includes beads (either porous or nonporous) that remove additional impurities from the air 20. It should be appreciated, however, that the term "filter media" is broadly used herein to define any filter mechanism that is operable to remove air-borne particles, including the structure of centrifugal filter 18. Clean air (secondary airflow) 24 is thus output and received by a duct collar 27 that extends from the hood 12 and connects to the buildings internal ductwork. The air 24 may thus travel directly out the building without being further cleansed, thereby increasing the time interval between regular duct cleanings and reducing the risk of fire. Furthermore, because the secondary filter 18 is disposed within the hood 12, it is more accessible to the user, for example, when the filter is to be cleaned.

Figure 7:
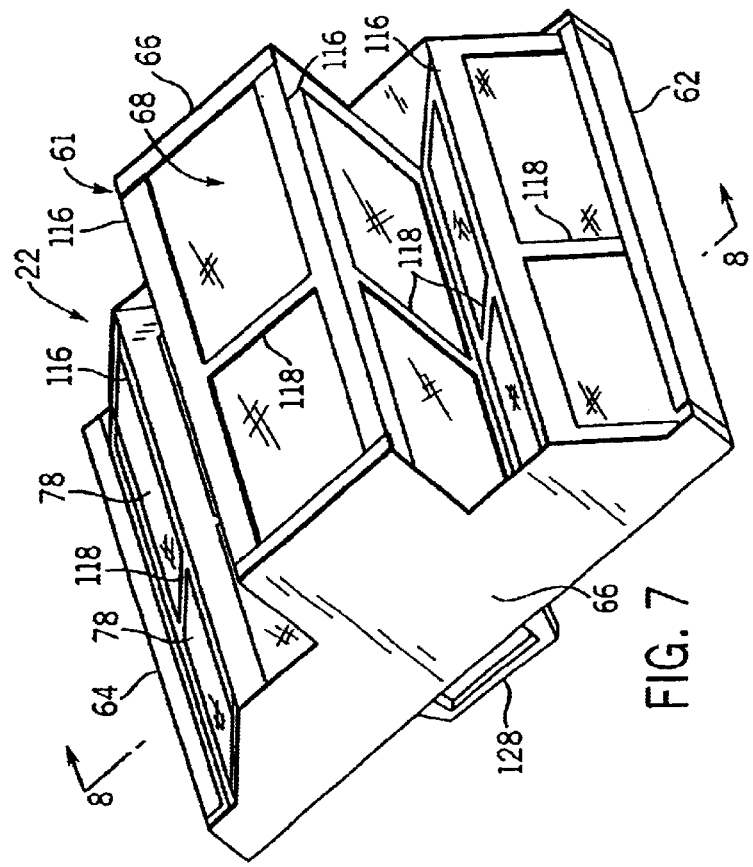
FIG. 7 is a perspective view of the secondary air filter illustrated in FIG. 1 showing the outlet.
Figure 6:
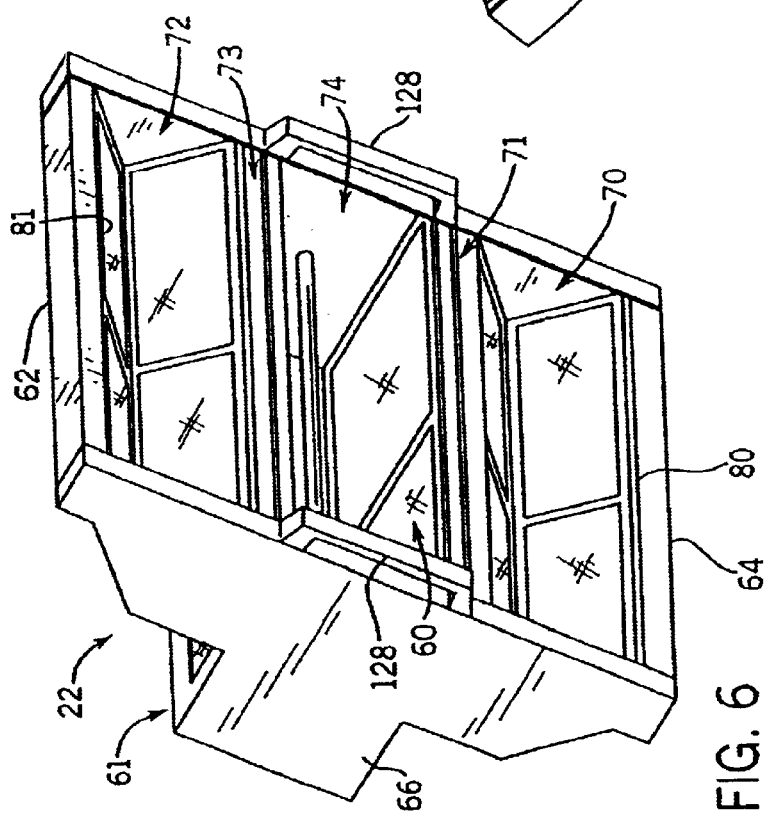
FIG. 6 is a perspective view of the secondary air filter illustrated in FIG. 1 showing the inlet.
Figure 8:
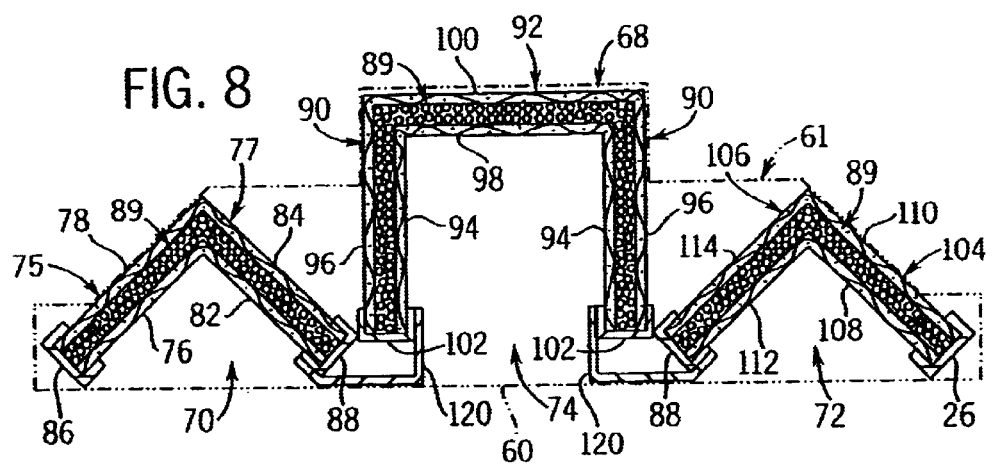
FIG. 8 is a sectional side elevation view of the secondary air filter illustrated in FIG. 7; taken along the line 8—8.

Referring now to FIGS. 6–8, the secondary air filter 22 includes a frame 61 that defines a front face 60 operable to receive incoming air. The front face 60 has an outer periphery defined by a top wall 62, bottom wall 64, and opposing end walls 66. A rear surface 68 is disposed opposite the front face 60, and allows cleaned air to exit the filter 22. The cavity formed by the walls 60, 62, 64, and 66 is partitioned into two outer air intake chambers 70 and 72, and a middle air intake chamber 74 by dividers 71 and 73 that extend across the front face 60. The front face 60 defines an inlet to the three chambers. It will become appreciated from the description below that the shape of intake chambers 70, 72, and 74 provide a greater surface area to the incoming air, thereby increasing the efficiency of the filter 22 over conventional flat filter designs.

The rear surface 68 is used herein to collectively identify the respective rear walls of each intake chamber, it being appreciated that the rear surface is not necessarily a flat or continuous wall. For instance, the rear surface 68 at the outer chamber 70 is defined by first and second outer walls 75 and 77, respectively. In particular, first wall 75 extends outwardly from the front end 80 of the bottom wall 64 at a 45° angle. The second wall 77 extends inwardly at a 90° angle from the distal end of wall 75 to the front face 60 of the chamber 70 (and thus defines a 45° angle with respect to the front face 60). The first and second walls 75 and 77, along with the front face 60, define a substantially right triangle when viewed in cross section, as illustrated in FIG. 8.

The first wall 75 is defined by a pair of inner and outer wire mesh screens 76 and 78 that extend parallel to each other and spaced apart to form a gap therebetween that houses a filter media 89. Likewise, the second wall 77 is defined by a pair of inner and outer wire mesh screens 82 and 84, respectively, that are connected to the outer ends of screens 76 and 78, respectively. Screens 82 and 84 extend parallel to each other, and are spaced apart to form a continuous gap with screens 76 and 78. The distal ends of screens 76 and 78 are sealed by an outer clip 86, and the distal ends of screens 82 and 84 are sealed by an inner clip 88. The enclosure defined by two pairs of screens and clips 86 and 88 ensures that air passing through chamber 70 will pass through the filter media 89.

The rear surface 68 at the middle chamber 74 is defined by two side walls 90 that extend perpendicularly outwardly from the front face 60, and a laterally extending top wall 92 that joins the outer ends of walls 90. Walls 90 and 92, along with front face 60, define a substantially rectangular chamber 74 when viewed in cross section. Side walls 90 include inner and outer wire mesh screens 94 and 96, respectively, that are offset from one another a predetermined distance to define a space therebetween that houses the filter media 89. Upper wall 92 includes and inner and outer pair of screens 98 and 100, respectively, that are connected to the outer ends of inner and outer screens 94 and 96, respectively, and are offset to define a gap therebetween that is also occupied by the filter media 89. The inner ends of screens 94 and 96 are sealed by clips 102 to define an enclosure to ensure that all air entering into the middle chamber 74 will pass through the filter media 89.

Outer chamber 72 is similar to chamber 70, and is defined by a first wall 104 that extends outwardly from the front end 81 of bottom wall 62 at a 45° angle. A second wall 106 extends inwardly at a 90° angle from the distal end of wall 75 towards the front face 60 of the chamber 72. For instance, the rear surface 68 is thus defined at the outer chamber 72 by the first and second walls 104 and 106, respectively. The first and second walls 75 and 77, along with the front face 60, define a substantially right triangle when viewed in cross section.

The first wall 104 is defined by a pair of an inner and outer wire mesh screens 108 and 110 that extend parallel to each other and spaced apart to form a gap therebetween that houses filter media 89. Likewise, the second wall 106 is defined by a pair of inner and outer wire mesh screens 112 and 114, respectively, that are connected to the outer ends of screens 76 and 78, respectively, and are also spaced apart to house the filter media. Screens 112 and 114 extend parallel to each other, and are spaced apart to define a gap that houses filter media 89. The distal ends of screens 76 and 78 are sealed by outer clip 86, and the distal ends of screens 82 and 84 are sealed by inner clip 88. The enclosure defined by two pairs of screens and clips 86 and 88 ensures that all air entering chamber 72 passes through the filter media.

During operation, incoming air 20 is received normal to the front face 60 of secondary filter 22 and is directed into each of the chambers 70, 72, and 72. Air 20 then passes through the inner screens defining the chamber walls, where airborne particles are removed by the filter media prior to exiting filter 22 via the outer screens. Clean secondary air 24 is then directed through the duct collar 27 and through the building's internal ductwork system before being expelled into the outdoor environment.

The inner and outer screens that define the walls of chambers 70, 72, and 74 are preferably spaced apart a distance less than one inch, and preferably less than ½ inch in accordance with the preferred embodiment, though it should be appreciated that any distance could be used in accordance with the present invention. Advantageously, it has been determined that the inner and outer screens may be positioned far enough apart that the pressure drop across the secondary filter 22 is no greater than 2 in H2O for a given airflow with a packed bed of filter media, as is described in more detail below.

Because air flowing through the filter 22 may exert a significant amount of pressure on the chamber walls, the outer surfaces of the outer screens of each chamber are supported by walls 116 that extend between end walls 66 at the junction between two screens. Walls 116 further act to seal each interface to ensure that all air entering the secondary filter 22 passes through the filter media 89. The screens are further supported by laterally extending beams 118 that join the midpoints of walls 116. A pair of walls 120 extends along the front face 60 and encapsulate clips 88 and 102 to provide a seal at the interface between outer chambers 70 and 72 and middle chamber 74. Walls 116 thus further prevent the incoming air 20 from flowing through the filter 22 without passing through the filter media 89.

While the chamber walls have been described herein as being defined by inner and outer wire mesh screens, it should be appreciated that the walls could be made out of any suitable porous material that is able to provide an adequate air flow rate therethrough.

Figure 10:
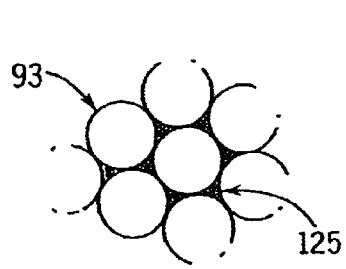
FIG. 10 is an illustration of a nonporous filter media used in the secondary air filter in accordance with an alternate embodiment.
Figure 9:
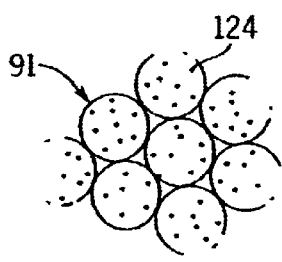
FIG. 9 is an illustration of a porous filter media used in the secondary air filter in accordance with the preferred embodiment.

Referring now to FIGS. 9 and 10, the filter media 89 comprises generally spherical beads 91 that are capable of absorbing grease from the incoming air 20. During manufacturing, a first end plate 66 is attached to walls 62 and 64. The beads 91 are poured between the inner and outer chamber screens at the other end to produce a packed bed of beads or any alternative material suitable for use in combination with the present invention. The second end plate 66 is subsequently attached to enclose the chamber walls. It should be appreciated that the diameter of the beads may vary, but a diameter between 1 and 4 mm is currently contemplated. The beads 91 are capable of removing smaller air impurities that were not removed by the primary filter 18. Advantageously, because end plates 66 are attached to the frame via nuts and bolts (not shown), an end user is able to remove the end plate 66 and the used beads 91, and insert new beads 91 into the filter without having to replace the entire filter 22.

Referring to FIG. 9 in particular, beads 91 are porous, and may comprise silica gel, a ceramic, a diatomaceous earth, zeolite, or any other porous material deemed suitable and durable enough to be made into a bead-like form and packed into a filtration device. Silica gel is used in accordance with the preferred embodiment because of its high affinity to grease in comparison to water vapor. While silica gel has been used in the past as an oil filter, the present invention recognizes that silica gel may further be used for the removal of grease and other impurities (e.g., VOC's) from grease-laden air.

During operation, grease-laden air 20 enters through the chamber walls and passes through the beads 91. The beads 91 act as baffles that cause the incoming air to make several sudden changes in direction such that the grease and other particles suspended in the air impinge against the beads and are absorbed into the interstices 124 of the filter media 89 during normal operation. Advantageously, because the impurities are stored within each bead 89, the gaps between adjacent porous beads are free of dirt, thereby enabling air to easily pass through the filter 22 without producing a significant pressure drop across the chamber walls. Once the beads become saturated, grease may begin to accumulate within the air gaps located between adjacent beads 91. Accordingly, it may be desirable to install a collection cup (not shown) to receive any grease that accumulates, as will now be described with reference to FIG. 10.

In particular, the filter media 89 may alternatively comprise nonporous beads 93, such as metallic beads, glass beads, or any other nonporous material suitable for use with the present invention. In accordance with this embodiment, the airborne grease and other impurities impinge against the beads and accumulate within the air gaps 125 formed between adjacent beads. As impurities accumulate, the pressure drop across chamber walls begins to rise until the drop is sufficiently great that incoming air drives the grease off the beads 89. The filter 22 would include a collection cup (not shown) to capture the impurities when nonporous beads 91 are used.

It should be appreciated that still other filter media 89 could be used with the secondary filter 22. For example, the filter media 89 could comprises a porous ceramic structure that is in the shape of the interior defined by any of walls 75, 77, 90, 92, 104, and 106 such that the walls are fabricated around the ceramic structure. In accordance with this embodiment, incoming air 20 passes through the porous structure, whose pores absorb the impurities that were not removed by the primary filter 18. A ceramic filter media has been found to exhibit a sufficient affinity to grease in comparison to water vapor, and is thus suitable for use as a filter media in secondary filter 22.

Both the primary and secondary filters may be regenerated using a commercial dishwasher and standard dishwasher detergents to remove grease and VOC'S. In some instances, such as the case where the pores extend completely through the beads, the filter should be soaked in a solution of commercial detergent in order to break down the grease which has been absorbed prior to removal of the grease in a commercial dishwasher.

Figure 5:
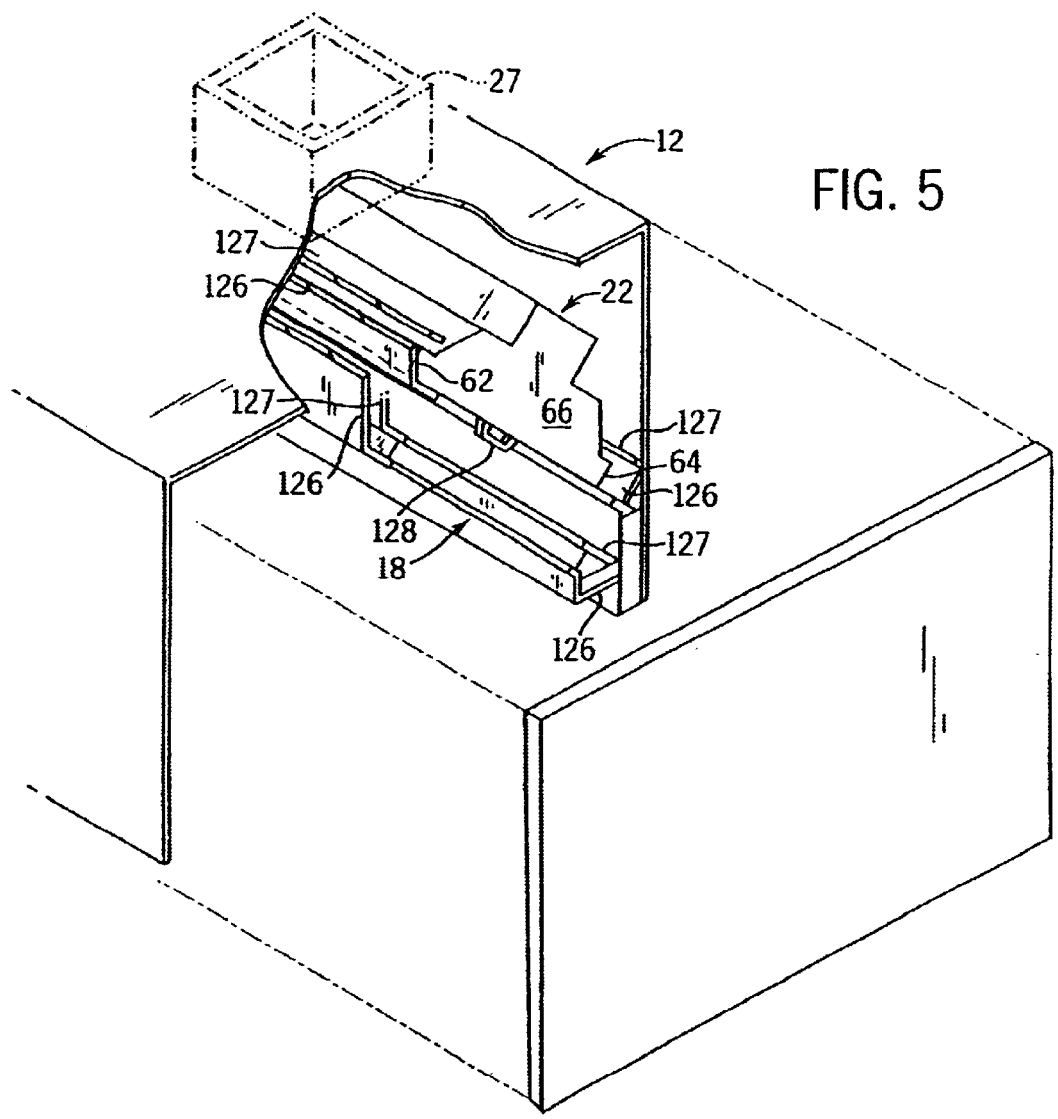
FIG. 5 is a perspective view of the hood illustrated in FIG. 1 with a portion cut away showing the removal of the filters.

Referring to FIG. 5, both the primary and secondary filters 18 and 22 rest on guide rails 126 and 127 that facilitate their removal from the hood 12. FIG. 5 illustrates the removal of the secondary filter 22, though it should be appreciated that the primary filter 18 is removable in the same manner. In particular, a pair of handles 128 extends from the front of end walls 66 to enable the easy removal and transport of filter 22. Guide rails 126 and 127 are spaced a sufficient distance such that a user may lift filter 22 up against the lower edge of upper guide rails 127 to provide clearance to swivel bottom wall 64 past the corresponding lower guide rail 126. Once one wall 64 has been disengaged from the guide rails 126 and 127, the upper wall 62 may be easily removed from engagement with its set of guide rails. It should be appreciated that a similar system may be used to removably mount the primary filter 18.

Figure 11:
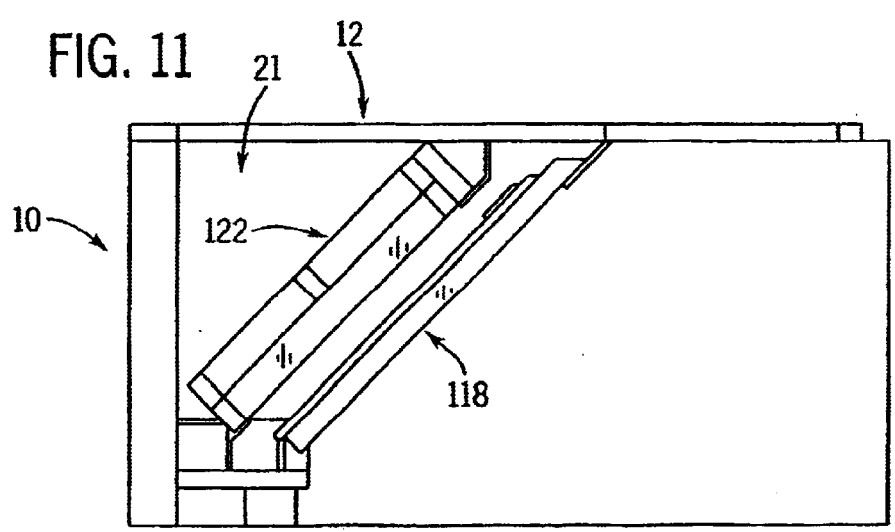
FIG. 11 is a side elevation view of a ventilation hood constructed in accordance with an alternate embodiment of the invention.

Referring now also to FIG. 11, a flat secondary filter 122 could be installed downstream of primary filter 18 in accordance with an alternate embodiment of the invention. However, it should be appreciated that hoods having only the primary air filter 18 installed are currently commercially manufactured in systems that employ a secondary filter at the outlet of a building's internal ductwork system. Because secondary filter 122 is flat, it would have to be elongated more than filter 22 in order to provide a great enough surface area to effectively and reliably clean the air 20 while supporting a sufficient air flow rate. However, the position of primary filter 18 in conventional systems would not allow for a sufficiently elongated secondary filter to be installed within enclosure 21. Accordingly, primary filter 18 would need to be moved back within the hood 12 in order to accommodate a further elongated secondary filter 122. The installation of a flat secondary filter 122 would thus necessitate that the manufacturing process of hood 12 be modified, which would consume additional expense and resources.

Advantageously, the chamber walls 75, 77, 90, 104, and 106 of filter 22 extend at least partially outwardly from the front face 60. Filter 22 thus utilizes the lateral distance allowed by the conventional hood 14 along with the available depth within the enclosure 21 to achieve a greater surface area than flat filter 122 without occupying a greater amount of lateral space within the hood 12. Conventional filter walls have been known to extend up to 45° from the front surface. However, the walls 90 of secondary filter 22 extend up to 90° from the front face, it being appreciated that any angle greater than 45° with respect to the front surface 60 will provide a greater surface area than the prior art. The increased surface area achieved by the walls of chambers 70, 72, and 74 enables a greater flow rate through the filter 22 and also achieves a high efficiency. The preferred embodiment thus enables the installation of secondary filter 22 in the hood 12 without having to modify conventional manufacturing and assembly of the hood/primary filter assembly.

While the present invention has been described with reference to a primary centrifugal air filter 18 and a secondary impact air filter 22, it should be appreciated that other filters could be used in an air purification system having a first stage that collects a large portion of the larger size airborne particles and a subsequent stage or stages that removes smaller particles not removed in the first stage and non-particle contaminants such as Volatile Organic Compounds prior to the air entering a building's internal ductwork. For example, filters 18 and 22 could comprise any one of a centrifugal filter, a baffle filter, an impact filter, or any other like filter suitable for removing airborne impurities.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An air purification system for receiving incoming air containing impurities and outputting purified air into ductwork of a building, the system comprising:
    a hood defining a hood outlet in communication with the ductwork;
    a primary filter member mounted to the hood for receiving the incoming air, removing at least a portion of the impurities therefrom, and outputting a primary airflow; and
    a secondary filter member mounted to the hood at a location downstream of the primary filter for receiving the primary output airflow therefrom, the secondary filter member having a secondary filter beads selected from the group consisting of silica, metal, glass, a diatomaceous earth, ceramic, and zeolite, wherein the beads are operable to remove impurities from the primary airflow and output a secondary airflow to the hood outlet that is cleaner than the primary airflow.

2. The air purification system as recited in claim 1, further comprising a duct collar connected between the hood outlet and the ductwork to receive the secondary airflow from the secondary filter and forward the secondary airflow to the ductwork.

3. The air purification system as recited in claim 1, wherein the primary air filter operates using centrifugal filtration principles.

4. The air purification system as recited in claim 3, further comprising a collector disposed at one end of the primary filter operable to receive impurities removed from the incoming air.

5. The air purification system as recited in claim 1, wherein the secondary air filter includes inner and outer porous walls which are spaced apart and entrap the secondary filter beads therebetween.

6. The air purification system as recited in claim 1, wherein the beads are porous.

7. The air purification system as recited in claim 1, wherein the beads are nonporous.

8. The air purification system as recited in claim 1, wherein the secondary air filter is operable to collect grease particles and VOC's.

9. The air purification system as recited in claim 7, wherein the beads defines gaps therebetween that are sized to store the additional impurities therein.

10. The air purification system as recited in claim 9, further comprising a collector disposed at one end of the secondary filter member operable to receive the additional impurities therefrom.

11. The air purification system as recited in claim 7, wherein the nonporous beads are selected from the group consisting of a glass and metal.

12. The air purification system as recited in claim 5, in which the outer porous wall is removable.

13. The air purification system as recited in claim 1, further comprising a fan operable to draw air through the primary and secondary filter members and out the duct collar.

14. The air purification system as recited in claim 3, wherein the primary filter member further comprises:
    an elongated air filter chamber having a front, rear and opposing end walls;
    a pair of inlets formed in said air filter chamber front wall, each inlet of said pair of inlets being located adjacent one of said air filter chamber end walls; and
    an outlet formed in said chamber rear wall and located substantially midway between the opposing end walls, wherein air enters said air filter chamber through said inlets and flows longitudinally toward said outlet through said air filter chamber in a helical path, and wherein said helical path causes impurities in said air to impinge upon walls of said air filter chamber prior to said air exiting said air filter chamber through said outlet.

15. The air purification system as recited in claim 1, in which the secondary filter member further comprises at least one chamber that contains the beads, wherein the chamber has a front porous surface receiving incoming air, and wherein the porous surface defines an angle substantially midway between 0 and 90 degrees with respect to the incoming air.

16. The air purification system as recited in claim 1, wherein the silica is a silica gel.

17. The air purification system as recited in claim 1, wherein the primary filter is a baffle filter.

18. The air purification system as recited in claim 1, wherein air output from the primary filter does not pass through a filter media prior to entering the secondary filter member.

19. An air filter chamber comprising:

a top wall;

a pair of side walls extending from outer ends of the top wall at one end and having distal ends at an opposite end in which the top and side walls are defined by inner and outer porous members enclosing a filtration media therein; and a front opening defined by distal ends of the side walls configured to receive incoming impure air, in which the air can flow from the opening into the top wall and side walls;

wherein the side walls extend substantially perpendicular with respect to the front opening.

20. The air filter chamber as recited in claim 19, wherein the inner and outer porous members are spaced apart by a distance less than one inch.

21. The air filter chamber as recited in claim 19, wherein the inner and outer porous members are spaced apart at a distance which does not allow a pressure drop greater than 2 in H2O.

22. The air filter chamber as recited in claim 19, wherein the filter media comprises a porous material.

23. The air filter chamber as recited in claim 22, wherein the filter media comprises a silica gel.

24. The air filter chamber as recited in claim 22, wherein the filter media comprises a ceramic.

25. The air filter chamber as recited in claim 19, wherein the filter media comprises a nonporous material.

26. The air filter chamber as recited in claim 25, wherein the filter media is selected from the group consisting of glass and metal.

27. The air filter chamber as recited in claim 19, further comprising a pair of end walls disposed at distal ends of the inner and outer porous members to seal the filter media therein.

28. The air filter chamber as recited in claim 27, wherein at least one of the end walls is removable.

29. A method of removing impurities from an airflow in an air purification system disposed upstream of a building's ductwork, the air purification system being of the type having a primary filter and a secondary filter, the steps comprising:

(A) drawing incoming air having air impurities into the primary filter;

(B) removing air particles from the incoming airflow at the primary filter to produce a primary airflow;

(C) outputting the primary airflow into a filter media of the secondary filter that includes filtering beads;

(D) removing air particles from the primary airflow at the secondary filter media to produce a secondary airflow; and (E) outputting the secondary airflow into the ductwork.

30. The method as recited in claim 29, wherein step (B) further comprises subjecting the incoming air to centrifugal forces.

31. The method as recited in claim 29, wherein the filtering beads are arranged as a packed bed of beads in the secondary filter.

32. The method as recited in claim 29, wherein the filtering beads are porous, wherein step (D) further comprises the step of absorbing impurities from the primary airflow into the beads.

33. The method as recited in claim 32, wherein the porous beads are made of silica.

34. The method as recited in claim 29, wherein the beads define air gaps therebetween, and wherein step (D) further comprises the step of receiving impurities from the primary airflow at the air gaps.

35. The method as recited in claim 34, wherein the beads are nonporous and selected from the group consisting of glass and metal.

36. The air purification system as recited in claim 29, wherein the beads are selected from the group consisting of silica, metal, glass, and ceramic.

37. The air purification system as recited in claim 36, wherein the silica is a silica gel.

38. The method as recited in claim 29, wherein the secondary airflow is output directly from the secondary filter into the ductwork without passing through an additional filter.

39. The method as recited in claim 34, wherein the beads are nonporous.

40. The air filter as recited in claim 29, wherein the primary filter is a baffle filter.

41. In an air purification system for removing airborne particles from an airflow prior to emitting the airflow into a buildings ductwork, the system including a hood defining a space for receiving incoming air having impurities and an outlet connected to the ductwork, and a primary filter mounted to the hood within the space, wherein the primary filter receives the incoming air and removes impurities prior to outputting once-filtered air towards the outlet, the improvement comprising:

a secondary filter mounted within the hood and disposed within the space at a location downstream of the primary filter, the secondary filter including a bed of filtering beads through which the once-filtered air from the primary filter flows, the secondary filter entrapping airborne particles to output twice-filtered air towards the outlet.

42. The improvement as recited in claim 41, the hood further comprising a top wall and a pair of side walls, wherein the primary and secondary filters extend between the top wall and at least one of the side walls within the hood.

43. The air purification system as recited in claim 41, wherein the bed of beads is packed.

44. The air purification system as recited in claim 41, wherein the secondary filter further comprises a wall that opens to enable the bed of beads to be removed from the filter.

45. The air purification system as recited in claim 41, wherein the beads are porous.

46. The air purification system as recited in claim 41, wherein the beads are nonporous.

47. Thee air purification system as recited in claim 41, wherein the secondary filler is disposed immediately downstream of the primary filter.

48. The air purification system as recited in claim 41, wherein the beads are selected from the group consisting of silica, metal, glass, a diatomaceous earth, and zeolite.

49. The air purification system as recited in claim 41, wherein the airborne particles are organic.

50. The air purification system as recited in claim 41, wherein the airborne particles comprise grease.

51. The air purification system as recited in claim 41, in which the primary filter and secondary filter are removably mounted to the hood to enable routine cleaning of the filters.

52. The air purification system as recited in claim 41, in which the primary and secondary filters are disposed in respective planes which are substantially parallel to each other.

53. The improvement as recited in claim 41, wherein the primary filter is a baffle filter.

54. A method of fabricating a two stage air purification system operable to receive incoming air having air impurities and outputting twice filtered air into the ductwork of a building, the steps comprising:
providing a hood outlet that is connectable to the ductwork, wherein the hood has a first filter mounted thereto to receive the incoming air and output once-filtered air toward the outlet; and
　mounting a second filter to the hood at a location downstream of the first filter to receive the once-filtered air and output the twice-filtered air toward the hood outlet, wherein the second filter has a media including filter beads, and wherein air can pass from the first filter to the second filter without passing through any other air filters.

55. An air purification system for receiving incoming air containing impurities and outputting purified air into ductwork of a building, the system comprising:
　a hood defining a hood outlet in communication with the ductwork;
　a primary filter member mounted to the hood for receiving the incoming air, removing at least a portion of the impurities therefrom, and outputting a primary airflow; and
　a secondary filter member mounted to the hood at a location downstream of the primary filter for receiving the primary output airflow therefore, the secondary filter member having a inner and outer porous walls defining a bed packed with secondary filter media operable to remove impurities from the primary airflow and trap therein the removed impurities and output a secondary airflow to the hood outlet that is cleaner than the primary airflow,
　wherein the filter media defines gaps therebetween that are sized to entrap the additional impurities therein.

56. The air purification system as recited in claim 55, further comprising a collector disposed at one end of the secondary filter member operable to receive the additional particles from the secondary filter.

57. The air purification system as recited in claim 55, wherein the nonporous media is selected from the group consisting of a glass and metal.

58. The air purification system as recited in claim 55, further comprising a removable outer wall that encloses the bed.

59. The air purification system as recited in claim 55, wherein the primary filter is a baffle filter.

60. An air filter comprising:
　a hood defining a space for receiving an incoming airflow having impurities and an outlet connected to the ductwork;
　a first filter mounted to the hood that receives the incoming airflow and outputs first-filtered air;
　a second filter mounted to the hood at a location downstream from the first filter with respect to the airflow, the second filter including two pairs of filtration chambers, each pair defining a front end that receives the first-filtered air and a rear end that outputs twice-filtered air, each pair of chambers including a first and second substantially rectangular panel that converge in a direction from the front end towards the rear end and meet, each panel including inner and outer porous walls that contain a plurality of filtration members.

61. The air filter as recited in claim 60, wherein the inner and outer porous walls are spaced apart by a distance less than one inch.

62. The air filter as recited in claim 60, wherein the filtration members comprise a porous material.

63. The air filter as recited or claim 60, wherein the filtration members are formed from silica.

64. The air filter as recited in claim 63, wherein the filtration members are formed from a silica gel.

65. The air filter as recited in claim 60, wherein the filtration members are formed from ceramic.

66. The air filter as recited in claim 65, wherein the ceramic is porous.

67. The air filter as recited in claim 60, wherein the filtration members are nonporous.

68. The air filter as recited in claim 60, wherein the filtration media is formed from a material selected from the group consisting of glass, metal, zeolite, and a diatomaceous earth.

69. The air filter recited in claim 60, wherein the filtration members comprise beads.

70. The air filter as recited in claim 60, wherein the second filter is removable flow the hood.

71. The air filter as recited in claim 60, wherein the first filter is a baffle filter.

\* \* \* \* \*

UNITED STATES PATENT AND TRADEMARK OFFICE
CERTIFICATE OF CORRECTION

PATENT NO. : 6,797,041 B2 Page 1 of 1
DATED : September 28, 2004
INVENTOR(S) : Kyle A. Brownell et al.

It is certified that error appears in the above-identified patent and that said Letters Patent is hereby corrected as shown below:

Column 10,
Line 37, "defines" should be -- define --.

Column 13,
Line 1, "Thee" should be -- The --.
Line 2, "filler", should be -- filter --.
Line 31, "a media", should be -- a filter media --.
Line 47, "therefore", should be -- therefrom --.

Column 14,
Line 34, "or", should be -- in --.
Line 51, "flow", should be -- from --.

Signed and Sealed this

Fourteenth Day of December, 2004

JON W. DUDAS
*Director of the United States Patent and Trademark Office*